United States Patent [19]

Moked et al.

[11] 4,032,391

[45] June 28, 1977

[54] LOW ENERGY RECOVERY COMPOUNDING AND FABRICATING SYSTEMS FOR PLASTIC MATERIALS

[75] Inventors: Isaac Moked, New Brunswick; Richard H. Handwerk, Somerville; Walter R. Marshall, Bloomfield, all of N.J.

[73] Assignee: Union Carbide Corporation, New York, N.Y.

[22] Filed: Sept. 3, 1975

[21] Appl. No.: 609,947

[52] U.S. Cl. .............. 159/47 R; 159/2 E; 159/DIG. 10; 418/206
[51] Int. Cl.² ............ B01D 1/00; B01D 1/28; F01C 1/18
[58] Field of Search ........... 159/48 L, 48 R, 2 E, 159/DIG. 10, 6 W, DIG. 20, 44, 47 R; 418/206

[56] References Cited

UNITED STATES PATENTS

| | | | |
|---|---|---|---|
| 2,205,328 | 6/1940 | Wills .......................... 25/11 |
| 2,325,573 | 7/1943 | Thompson et al. ............. 159/44 |
| 2,719,776 | 10/1955 | Kummel ....................... 159/48 L |
| 2,970,089 | 1/1961 | Hunt et al. ................... 159/DIG. 10 |
| 3,149,056 | 9/1964 | Longstreth et al. ............. 159/13 A |
| 3,156,009 | 11/1964 | Alsys .......................... 159/2 E |
| 3,177,127 | 4/1965 | Longstreth ................... 159/2 E |
| 3,217,783 | 11/1965 | Rodenacker ................... 159/2 E |
| 3,234,994 | 2/1966 | Dance ......................... 159/47 R |
| 3,280,886 | 10/1966 | Marshall et al. .............. 159/2 E |
| 3,360,822 | 1/1968 | Schippers ..................... 259/191 |
| 3,360,822 | 1/1968 | Schippers ..................... 252/191 |
| 3,395,746 | 8/1968 | Szabo et al. ................... 159/47 R |
| 3,414,980 | 12/1968 | Nezbed ........................ 159/DIG. 20 |
| 3,414,980 | 12/1968 | Nezbed ........................ 159/DIG. 20 |
| 3,425,993 | 2/1969 | Perry .......................... 159/6 W |
| 3,554,263 | 1/1971 | Bachmann ..................... 159/6 W |
| 3,599,701 | 8/1971 | Mollerstedt et al. ............ 159/16 R |
| 3,746,481 | 7/1973 | Schippers ..................... 418/83 |
| 3,748,103 | 7/1973 | Bean et al. .................... 159/48 R |
| 3,817,668 | 6/1974 | Mayer ......................... 418/206 |
| 3,837,768 | 9/1974 | Haupt .......................... 418/206 |
| 3,841,381 | 10/1974 | Dassesse et al. ............... 159/DIG. 20 |
| 3,863,905 | 2/1975 | Maxwell ....................... 259/191 |

Primary Examiner—Jack Sofer
Attorney, Agent, or Firm—Gerald R. O'Brien, Jr.

[57] ABSTRACT

Plastics recovery and polyolefins compounding systems utilize a gear pump for the pumping function. The gear pump is specially designed to include a free media surrounding substantially the entire gear face with minimum sealing to improve volumetric pump efficiencies and provide pumping capacity insensitivity to viscosity over a wide range. A method of monitoring melt index and production rate for reactor control is also disclosed.

7 Claims, 20 Drawing Figures

LOW ENERGY RECOVERY COMPOUNDING AND FABRICATING SYSTEMS FOR PLASTIC MATERIALS

The present invention relates to systems for handling polymers and more particularly to system for handling compositions of polymers and volatile constituents, such as polyethylene and ethylene and means for increasing the efficiency of compounding systems for these compositions.

BACKGROUND

In the typical production of low density polyethylene, a reactor discharges a stream which is a mixture of polymer and unreacted materials to a product receiver. The product receiver operates at a pressure substantially below the reactor pressure and flow of the reactor discharge is controlled by the product valve. In the product receiver, the major portion of the unreacted materials are removed due to flashing which results from the drop in pressure experienced by the mixture. The flashed material, commonly referred to as the return gas, is subsequently returned to the reactor. The remaining polymerized material settles in the product receiver and still contains some unreacted materials which are removed in the remainder of the polymer recovery system.

The polymer discharged from the product receiver is fed to an extruder through a polymer flow control system. The extruder performs two functions in this system: (1) final devolatilization to remove the remaining unreacted material; (2) pumping of the polymer through a screen pack, if one is being used, and a pelletizer die plate.

The material enters the side of the extruder and the unreacted materials flash and form a foam having a very low density. Therefore an extruder having a very large volumetric conveying capacity in the feed section is necessary to handle the material as the final devolatilization is occurring. Normally an extruder having a two-diameter screw or an oversize single-diameter screw is necessary to obtain the necessary conveying capacity to handle the material entering the extruder. In some installations a portion of the flashed material is removed from the extruder through a top mounted vent stack.

As the production rate of single low density polyethylene (LDPE) reactors are increased, larger and larger extruders, which become prohibitively expensive, are needed. In an effort to eliminate the use of two-diameter extruders or oversized extruders, some existing units have been modified to include a secondary ethylene separation (flashing) operation upstream of the extruder inlet subsequent to the primary product receiver ethylene separation (flashing) operation.

This system differs from the side fed extruder top mounted vent stack type in that the material is fed into the top of the vent stack and the remaining unreacted materials are released before the polymer stream enters the extruder. This method provides a material to the extruder which has a much greater density and eliminates the need for two-diameter extruders or large single-diameter extruders. The devolatilization and pumping functions of the original, two-diameter extruder system have now been separated, i.e. the final devolatilization is performed in the vent stack and only the polymer pumping is performed by the extruder. However, extruders pump polymer by developing viscous drag, and are very inefficient pumps.

SUMMARY OF THE INVENTION

The present invention relates to an improved plastics recovery system in which polymer produced in a reactor is partially devolatilized in a product receiver, transferred to the top of a vent stack for final devolatilization and flood fed to a low net positive suction head gear pump.

The use of the specially designed gear pump having a free filling space surrounding substantially the entire periphery of the gears provides a minimum flow path length in the order of the gear tooth depth which is an order of magnitude less than similar sized positive displacement pump inlet paths. Additionally, the shear areas and energy dissipation in shear is an order of magnitude lower than comparable positive displacement pumps.

Specifically, the gear pump includes a pair of intermeshing, herringbone gears surrounded by a smooth, continuously increasing filling chamber toward the inlet. The gears seal with the housing at a minimum seal area sized to seal substantially one tooth tip adjacent the outlet of the pump. The outlet is sized to correspond in width to the gear face width and the length is one tooth height, thereby providing improved volumetric pumping efficiency.

In some recovery systems where the polymer is discharged in the form of a rope, a pair of rollers are provided directly above the gears. The rollers pull the polymer rope into a charging area between the rollers and gears to fill the gear cavities and also densify the foamed polymer.

Suitable instrumentation is disclosed for monitoring pump parameters to provide on line viscosity and production rate control.

Thus the features to be described in greater detail below include a comprehensive low density polymer recovery system which includes a novel gear pump for reduced capital, operational and maintenance cost.

Another feature is a novel gear pump structure for handling a broad range of production rates.

A further feature is a gear pump having roller charging capabilities for pumping polymer material produced in the form of strand or rope.

Yet another feature is the provision of on line additive injection at the pump of a recovery system and modular construction of the pump body, feed gears and rollers.

These and still other features will be readily apparent from the drawings and disclosure to follow.

DETAILED DESCRIPTION OF A PREFERRED EMBODIMENT

Figure 1:
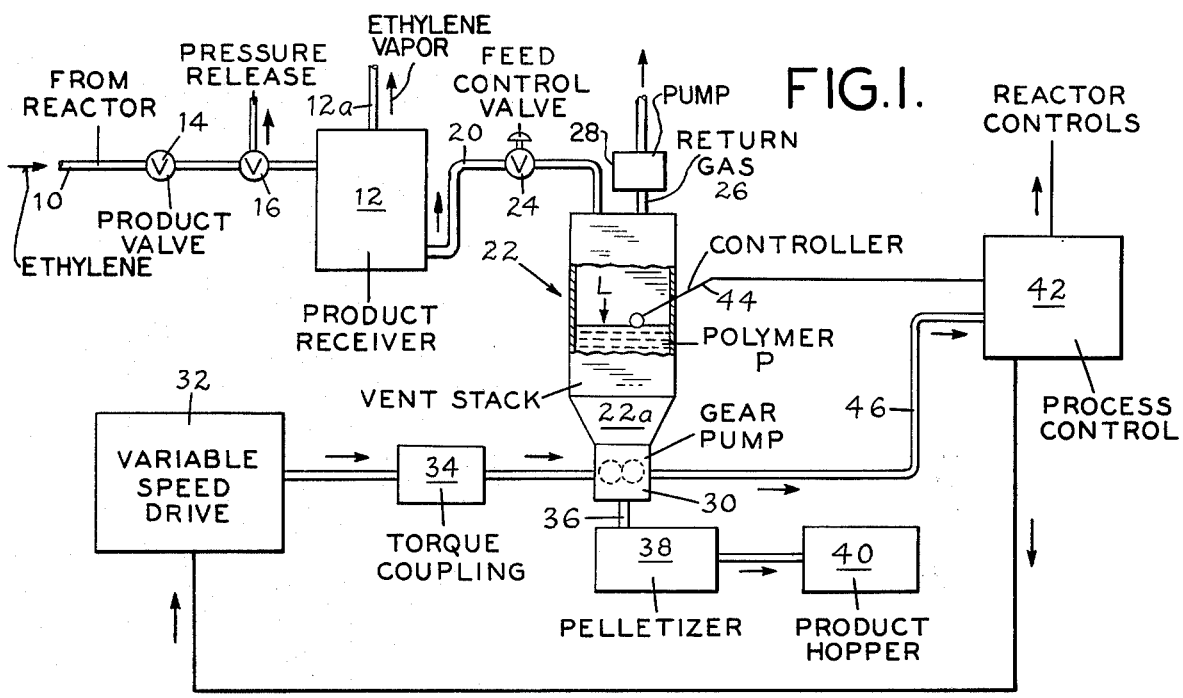
FIG. 1 is a schematic view of a low energy recovery system in accordance with the present invention.

While this invention is susceptible of embodiment in many different forms, there is shown in the drawings and will hereinafter be described in detail a preferred embodiment of the invention, and modifications thereto, with the understanding that the present disclosure is to be considered as an exemplification of the principles of the invention and is not intended to limit the invention to the embodiments illustrated.

THE RECOVERY SYSTEM

FIG. 1 illustrates an integrated system for the production of low density polyethylene in accordance with the present invention. A composition of liquid polyethylene and entrained ethylene is produced in a reactor (not shown), as is well known in the art. The composition is discharged from the reactor through line 10 into a product receiver 12. The mixture flow to product receiver 12 is controlled by a product valve 14 and a pressure relief valve 16 in line 10. The bulk of the entrained ethylene gas is removed from the mixture by flashing in product receiver 12 and the thus removed ethylene gas is condensed and recycled to the reactor through line 12a for further use. The partially devolatilized polyethylene collects at the bottom of product receiver 12 and is transferred through line 20 to the top of a vent stack 22.

Transfer of the liquid polyethylene to the vent stack is accomplished by a pressure gradient which exists between product receiver 12 and vent stack 22. The product receiver operates at pressures in the order of 1000 p.s.i. or higher and the vent stack is operated at pressures at or slightly above or below atmospheric pressure. The flow rate of polyethylene to vent stack 22 is controlled by a feed control valve 24 in line 20, and a sufficient level of liquid polyethylene is maintained in the product receiver to prevent blow through of ethylene directly to the vent stack.

As the polyethylene enters vent stack 22, substantially all of the remaining entrained ethylene flashes from the mixture due to the pressure-equilibrium relationship at the pressure of the vent stack. The low pressure in the vent stack and removal of the ethylene is accomplished through a return line 26 which includes a pumping means 28, such as a venturi nozzle or vacuum line. The return vapor in line 26 is collected for further processing in the reactor.

Polyethylene melt P settles in the vent stack and is allowed to achieve a liquid level L. The bottom of vent stack 22 is in fluid communication with a gear pump 30, described in greater detail below, through a tapered outlet portion 22a. The level of the liquid polymer in the vent stack is maintained such that polyethylene-ethylene interface is above the pump inlet and the diameter of the vent stack is such that the pressure drop caused by the flowing polymer pool is equal to, preferably less than the pressure head formed by the liquid level of the polymer. Finally the level of the polymer is sufficient to provide a pressure head to the pump to prevent cavitation. Thus, gear pump 30 is flood-fed by the liquid polymer P in the vent stack.

Gear pump 30 is driven by a variable speed drive 32 and torque coupling 34 to withdraw polymer from the bottom of the vent stack and pump it under pressure through conduit 36 into a pelletizer 38 or other equipment, such as a screen pack, for final processing and delivery of the polymer to product hopper 40.

Control of the system is provided by a central process control 42 which, in addition to monitoring the function and operation of the reactor, as is known in the industry, monitors and controls the above-mentioned equipment. More specifically, a liquid level controller 44, which may be either of the displacement or rate types, as discussed more fully below, senses the level (or rate of change of level) of polymer in the vent stack. This variable is utilized by the process control 42 to set the variable speed drive 32 to insure that the polyethylene-ethylene interface does not occur at the pump which could lead to ethylene entrainment in the polymer as it passes through the pump. Also, the level control may be utilized to provide an indication of production rates, as discussed below.

Additionally, the process control unit monitors power input to the pump, and inlet and outler pressures and temperatures at the pump through lines 46. The exact instrument for monitoring these variables are well known in the instrumentation art and include torque meters, pressure transducers, either mechanical or electrical, e.g. piezoelectric transducers and thermocouples or thermistors, respectively. From these measured variables on-line viscosity monitoring is achieved. Viscosity is inversely related to the product melt index which is a primary control variable for reactor control in the production of polymers. Thus, these measured variables are fed back in the process control unit 42 to provide control of polymer production in the reactor.

THE GEAR PUMP

Figure 2:
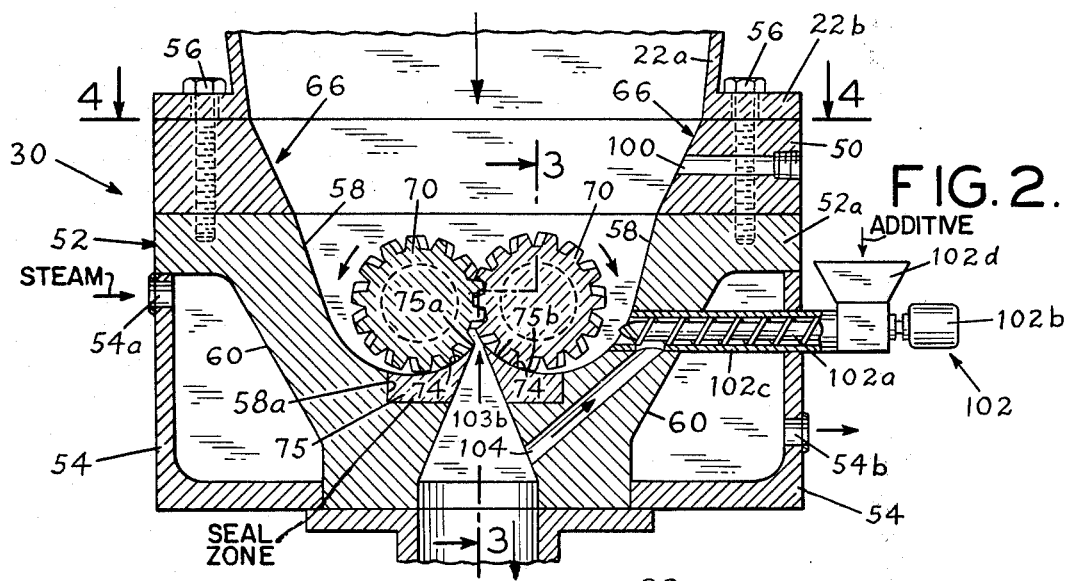
FIG. 2 is an enlarged cross-sectional view of a gear pump for use in the low energy recovery system of FIG. 1.
Figure 3:
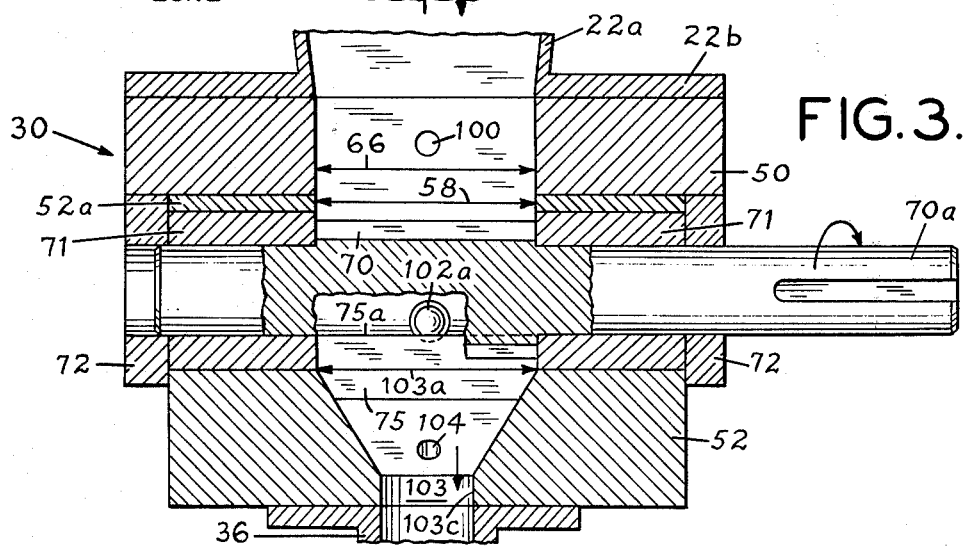
FIG. 3 is a cross-sectional view with certain portions broken away for clarity taken generally aong line 3—3 in FIG. 2.
Figure 4:
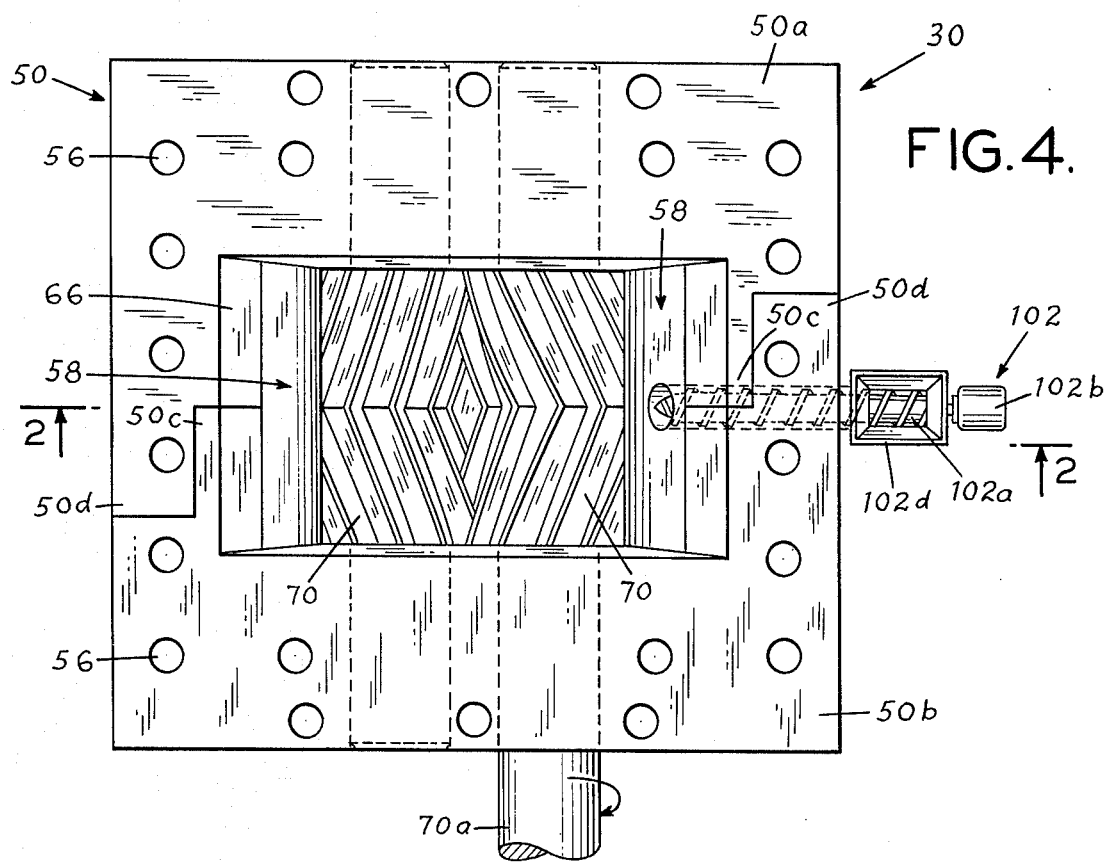
FIG. 4 is a top plane view taken generally along line 4—4 of the pump in FIG. 2.

FIGS. 2—4 illustrate gear pump 30 specifically designed to provide a minimum net positive suction head and improved polymer pumping capability. Pump 30 is modular in construction and includes an inlet structure 50, gear housing 52, and steam jacket 54. Inlet structure 50 includes two plate-like elements 50a and 50b FIG. 4 of generally L-shaped configuration and having interlocking end portions 50c and 50d as best illustrated in FIG. 4. Inlet structure 50 is coupled to a peripheral flange 22b on the outlet of vent stack 22a and to gear housing 52 by a plurality of fasteners 56, FIG. 2.

Gear housing 52 is generally rectangular in outer dimension and includes an upper flange portion 52a, which abuts against the lower surface of inlet structure 50, and sidewalls which define a gear chamber 58 at their inner surface and taper downwardly at two opposite outer surfaces 60 to define the inner surface of a steam chest. The steam jackets 54 are removably mounted to the gear housing 52 by means, not shown, and complement the tapered sides 60 to form a steam chest about the gear pump. The steam jackets include a steam inlet 54a for admitting steam from a source (not shown) and condensate outlet 54b to maintain the pump at a temperature above the melting temperature of the polymer. Alternatively, passageways such as drilling, described below, may be utilized in a solid pump body configuration.

Referring particularly to FIGS. 2 and 3, inlet structure 50 defines an inlet 66 whose width (parallel to the gear axis) is approximately equal to the gear width, FIG. 3, and whose minimum length (normal to the gear axis) taper downwardly to complement the gear chamber 58.

A pair of intermeshing herringbone gears 70 are rotatably mounted in gear housing 52 by means of journal bearings 71 and end plates 72, FIG. 3. One of the gears (the drive gear) includes a drive shaft 70a which extends outwardly from the gear pump to be coupled to the torque coupling 34 FIG. 1 and thereby provide power input to the pump. The other gear is driven by the intermeshing relationship of the herringbone gears.

Journal bearings 71 are lubricated by the polymer melt, and as discussed below provide a means for monitoring the viscosity of the polymer melt. The length and diameter of the bearings and clearances are such that high pressure leakage is minimized by a throttling effect.

The chamber 58 in which the intermeshing gears 70 are located is designed to achieve an inlet of minimum restriction of polymer flow to improve volumetric efficiency. Substantially all of the faces of the gears are exposed to the media free space (the volume between the gear faces and walls of chamber 58). This configuration permits the development of a pressure gradient within the media free space to facilitate the filling of the gear tooth cavities with polymer.

To achieve the necessary large media free space and still provide the necessary seal between the outlet 103 and the low pressure inlet of the pump, the pump discharge opening 103 and seal zone 74 must be minimized. The portion of outlet 103 in direct communication with the gear chamber defines a generally rectangular shaped opening having a width 103a, FIG. 3, equal to the gear face width and a length 103b, FIG. 2, equal to about the gear tooth height.

The outlet is defined, in part, by high wear resistant seal zone inserts 75, which are removably secured to a seat 58a in the gear housing as by bolts, not shown. Each seal zone extends from the tip 75a of the inserts 75 for a circumferential distance slightly greater than the circumferential distance between adjacent gear tooth tips to provide an effective seal between the gear teeth and gear housing. The start of the seal zone is generally indicated by numeral 75b, and the seal extends to tip 75a. It should be noted that a seal length larger than that just specified does not significantly increase seal effectiveness but does reduce the ability of the polymer to fill the gear tooth cavities.

The inner surface of chamber 58 increases in radius from the start of the seal 75b in a continuous smooth curve to join the inlet structure chamber 66 just above the tops of gears 70. In one pump embodiment the gear chamber or media free space boundary extends from a location 75b 53° below the horizontal plane passing through the axis of the proximate gear as measured from said axis in a rising circular arc to a location 15° below the horizontal to provide a radial distance between the tooth tip circle and chamber surface of ½ inch at that point, and extends linearly and outwardly from the 15° point to the top of the pump. In general, the ratio of free media space inner wall radius expansion to the circumferential distance (as measured from the end of seal zone 75b) is optimized in accordance with lubrication theory to achieve an increasing hydraulic radius in the media free space to fill to gear tooth cavities with polymer. The pressure gradient increases from the seal zone 75b to produce a maximum pressure gradient preferably below the horizontal elevation of the gear axes. The optimal media free space configuration is a function of the particular polymer being pumped. A ratio in the range of about 0.2 to 0.9 in/in is a typical value for polymers having viscosities in the range of 0.2 to 1.4 lb. sec./in$^2$, respectively.

With particular reference to FIGS. 2 and 3, the outlet 103 has a smooth and gradual transition which changes from the slot-like opening 103b adjacent the gears to form a circular discharge outlet 103c at its lower end, which is in fluid communication with conduit 36.

The herringbone gears 70 may have helix angles ranging up to 30°; however, smaller helix angles, 15° or less, are preferred to avoid leakage at gear intermesh. Most preferably, herringbone gears with a helix angle of 7°–10° are used to avoid trapping polymer in the tooth cavities. The use of herringbone pattern gears is preferred to constant helical or spur gears due to reduced stress loading on the gears and housing realized with the herringbone gears.

The use of a gear pump and more particularly a gear pump with herringbone gears provides economic savings in capital cost, operating cost and improved performance in comparison to screw extruders used for the polymer recovery system. More specifically, for a recovery system capable of handling 30–50,000 lbs./hr., system investment cost may be up to 50% less for a gear pump equipped system. In gear pump recovery systems for capacities of, 2800–4500 lbs./hr. horsepower requirements ranged from 7 to 17 horsepower as opposed to 35 to 60 horsepower for a comparable extruder system. A comparable reduction in shaft horsepower equates to an annual cost savings for a 30–50,000 lb./hr. system in the order of 150,000/year assuming 3.6 cents/kw. hr. electric costs.

Finally, the viscous shear dissipation work is greatly reduced by the use of the gear pump as compared to a screw extruder. The reduction in this work is about one order of magnitude. This reduction, of course, results in a reduction in the temperature rise of the polymer as it passes through the gear pump. Steady state temperature rises of 1° to 4° C have been experienced with the gear pump of this invention, as compared to 10° to 35° C for a comparable screw extruder. The reduced temperature rise provides better product property control and less thermal degradation of the polymer product.

The gear tooth helix angle and free media space of the gear pump provide improved handling and volumetric efficiency. Table I indicates a comparison of operating parameters for several configurations which illustrate the effects of gear tooth angle and free media space on gear pump performance. The body types include one in which the minimum inlet length was equal to two pitch diameters plus one tooth height (MIN) and the full media space gear chamber embodiment (FULL), as described above. The MIN media free space inlet dimension was located 25° above the horizontal gear axis and extended therefrom in a circular arc to a location 20° below the horizontal gear axis (the start of the seal zone). Each unit was equipped with herringbone gears with the indicated helix angles and identical outlet shapes.

From Table I, it will be noted that the FULL media space configuration, i.e. the least restricted inlet configuration, provided volumetric capacities which were essentially constant for the range of product tested. The gear pump of the present invention is essentially insensitive to viscosity and pressure conditions with respect to its pumping capacity, and its volumetric efficiencies are essentially 100% over a range of gear pitch line velocities up to 150 ft./min.

The designations MIN and FULL as well as the characteristics of the pump structure given in connection with Table I are illustrative embodiments and should not be interpreted as setting forth the limits of applicants' invention. The values listed in the first six columns from left to right represent short tests for peak performance of the gear pump, while the last two columns represent long term steady-state operating conditions for a reactor system having the indicated production rates.

An additional advantage of the gear pump is increased recovery system operation. Unlike a screw extruder system which is highly sensitive to polymer viscosity, the gear pump being a positive displacement pump will continue to pump even if large changes in viscosity are experienced. An extruder on the other hand, would have to be shut down and cleaned, when high or low viscosity are introduced into it. Thus, reactor down time is decreased and reliability is greatly increased with the gear pump.

which is related to the product melt index as is known in the art. This signal is then used to monitor the product melt index via viscosity monitoring and tied back into the reaction control system for closed-loop melt index control. Since the component instrumentation for carrying out the individual measurement of these variables is well known in the instrumentation art, a detailed description of them will not be presented. However, the manipulation of these data to achieve viscosity monitoring and production rate control will be described in detail.

The gear pump horsepower is the sum of the volumetric pumping work and viscous dissipation work. The viscous dissipation work is primarly due to viscous dissipation work in the pump bearings. Assuming all the viscous dissipation takes place in the pump bearings, the total horsepower can be represented by:

$$HP = \mu \dot{\gamma} VA + Q \Delta p \quad [1]$$

where:
$\mu$ = material viscosity in bearings;
$\dot{\gamma}$ = shear rate in bearings;
$V$ = surface velocity of shaft in bearings;
$A$ = total surface area of shaft in bearing = $\pi LD$
$Q$ = volume of material being pumped; and
$\Delta p$ = pressure differential across the pump.
The total horsepower can also be represented by:

$$HP = 2 \pi TN \quad [2]$$

where:
$T$ = torque;
$N$ = ratational speed.
Furthermore, the shear rate ($\gamma$) can be represented by:

$$\dot{\gamma} = \pi TN \div C \quad [3]$$

where:
$D$ = bearing diameter;
$C$ = bearing clearance; and Q can be expressed by:

$$Q = qN \quad [4]$$

where:
$q$ = displacement/rev.
Combining these equations and using constants for the fixed parameters results in the following relationship:

$$\mu = k_1 \frac{T}{N} - k_2 \frac{\Delta p}{N} \quad [5]$$

TABLE I

| Body Type | Min. | Min. | Min. | Full | Min. | Full | Full | Full |
|---|---|---|---|---|---|---|---|---|
| Gear Angle (Degrees) | 30 | 15 | 15 | 15 | 15 | 15 | 15 | 15 |
| Melt Index | 5.7 | 5.7 | 2.1 | 2.1 | 0.1 | 0.1 | 0.1 | 2.1 |
| Rate (lbs./hr.) | 10,000 | 9,000 | 8,500 | 9,000 | 7,600 | 8,700 | 3,300 | 3,010 |
| RPM | 120 | 103 | 101 | 101 | 94 | 97.6 | 37 | 34 |
| Lb./Rev. | 1.39 | 1.46 | 1.40 | 1.50 | 1.35 | 1.49 | 1.47 | 1.48 |
| Volumetric Efficiency (%) (Foam Density of 30 lb./ft.[3]) | 93% | 97% | 93% | 99+% | 90% | 99% | 98% | 99% |
| T in (° C) | — | 277 | 270 | 260 | 280 | 271 | 281 | 273 |
| T out (° C) | — | 288 | 282 | 268 | — | 276 | 283 | 276 |
| P in (PSIG) | 1 | 1 | 1 | 1 | 1 | 1 | 1 | 1 |
| P out (PSIG) | 850 | 850 | 1,400 | 1,350 | 2,800 | 3,100 | 1,970 | 820 |

On-Line Viscosity Monitoring and Reactor Control

As previously described, the gear pump recovery system includes instrumentation that measures pump input power and inlet and outlet pressures and temperatures. From this information, the signals are conditioned to provide on-line viscosity monitoring system where:

$$k_1 = \frac{2C}{\pi^2 D^3 L} \text{ and } k_2 = \frac{aC}{[\pi D]^3 L}$$

The last term ($k_2 (\Delta p/n)$) can be eliminated for a simplified model since the numerical value of the torque encountered can be one or two orders of magnitude greater than the developed discharge pressure, providing a model:

$$\mu = k_1 (N/T) \qquad [6]$$

In plant experiments, the torque and speed measurements produced viscosity determinations which agreed closely with the laboratory melt index analysis of the materials being processed.

The model can be modified to include product temperature effects on the viscosity monitoring system by measuring the product temperature at the inlet of the pump. This modification has only a slight effect on the viscosity determinations since the temperature of the material in the bearings will reach a temperature which is dependent primarily upon the pump speed and material viscosity rather than the pump inlet or outlet temperatures. In effect, the temperature variations of the product being processed will have a small effect upon the on-line viscosity determinations.

Due to non-linear relationship between melt index and viscosity and simplifying assumptions in the model, the viscosity may not always be a true viscosity but it will provide a trend indication, which is one of the main criteria needed for closedloop control systems.

Production Rate Indication

The level L in the vent stack 22 can be maintained at a set level by varying the pump speed as necessary to maintain a set level using conventional set point control equipment. When using this type of vent stack level control, the instantaneous production rate is directly proportional to the pump speed and can be measured by a tachometer to provide production rate data to control 42.

The gear pump speed can also be controlled by using the continuous vent stack level signal to directly control the gear pump speed. In this mode of operation, a higher production rate would tend to fill the vent stack to a higher level and then the direct use of the continuous level signal to the gear pump speed control would increase the pump speed proportionately to the change in level. In normal operation, this leads to a higher vent stack level and higher pump speed for higher production rates which are associated with the higher melt index materials. Therefore the vent stack level can be used as an indication of the instantaneous production rate.

Modified Gear Pump

Figure 5:
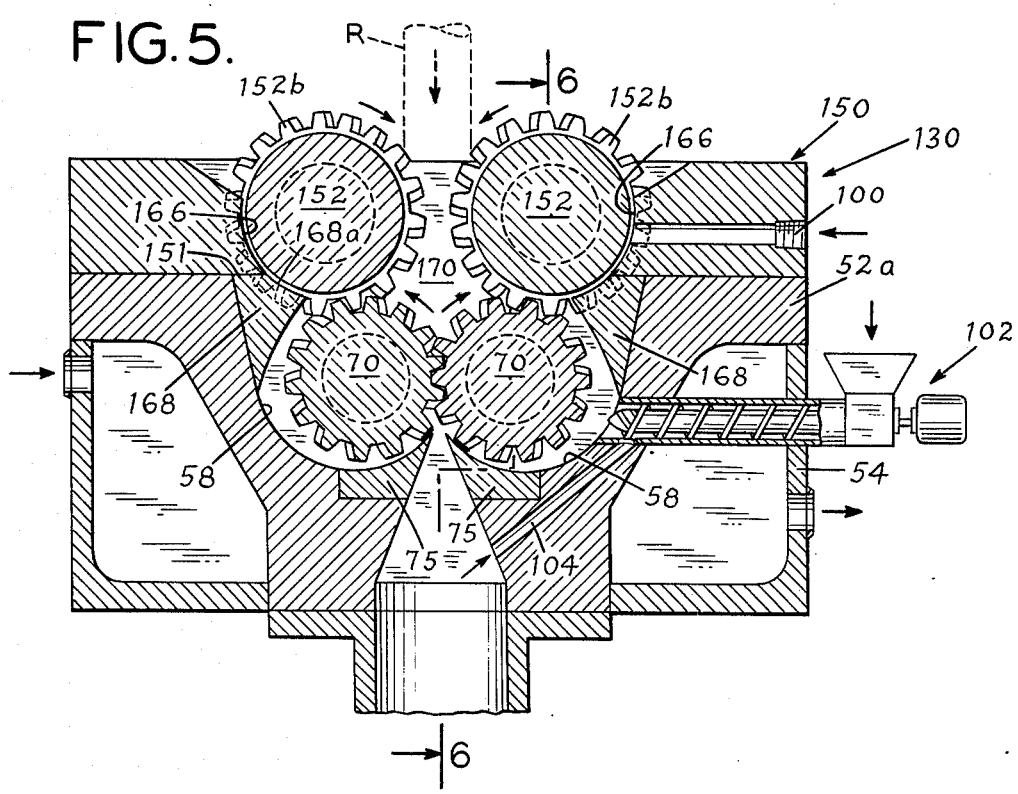
FIG. 5 is a cross-sectional view of a gear pump with feed rollers for handling feed in rope form.
Figure 6:
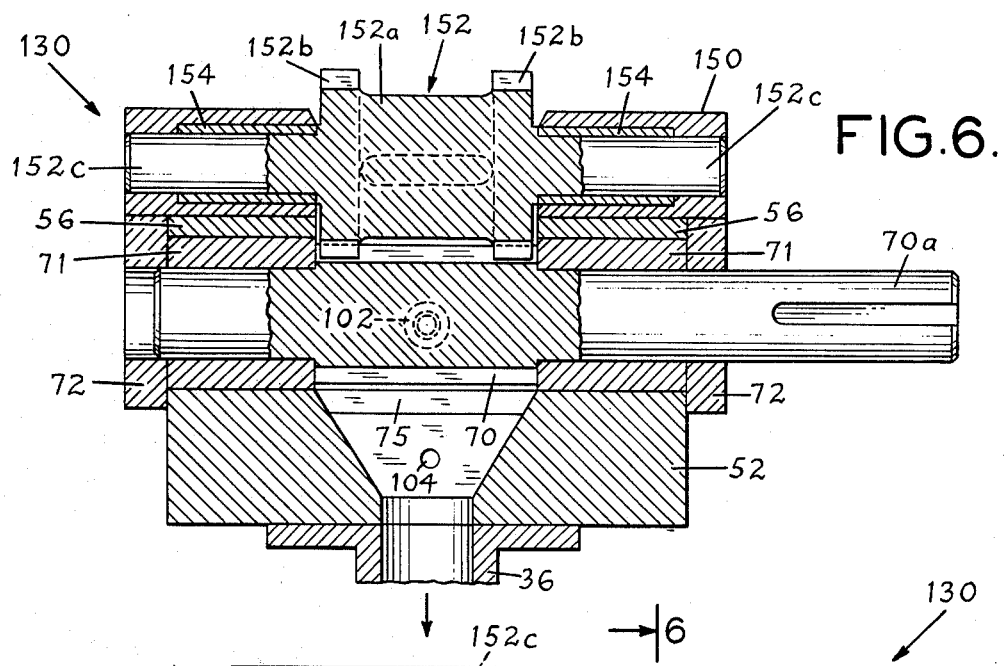
FIG. 6 is a sectional view taken along line 6—6 in FIG. 5.
Figure 7:
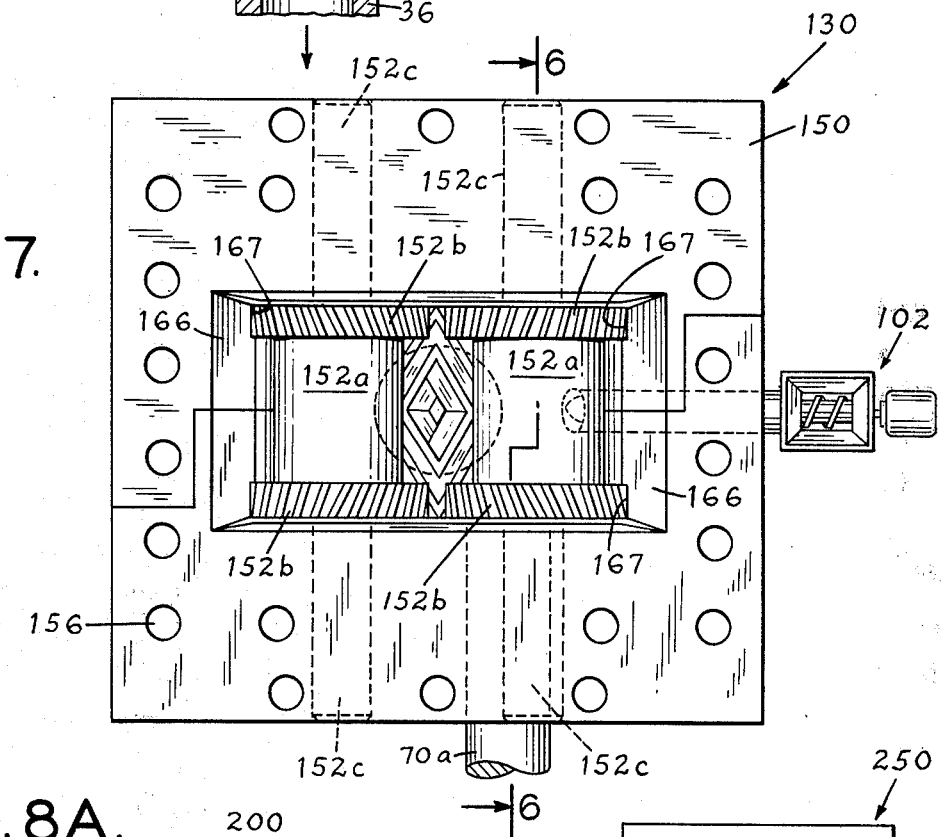
FIG. 7 is a top plane view of the pump of FIG. 5.

FIGS. 5–7 illustrate a modified gear pump 130 of this invention for use in polymer recovery systems in which the polymer is discharged in the form of a tacky rope R, shown in phantom line in FIG. 5.

The use of gear pump 30, described above, in a polymer rope discharge system would tend to force the rope against one side of the pump inlet due to the rotation of gears 70. This would lead to reduced pumping capacity since the rope would feed only one gear or possibly bridge the pump leading to no pumping at all.

To prevent these situations from occurring and to provide a positive inlet pressure to the gears, pump 30 is modified to achieve pump 130. Common elements of pump 30 and 130 are correspondingly numbered, and a detailed description of these common elements will not be repeated.

Due to the modular construction of the gear pump 30, only inlet structure 50 need be removed and replaced with modified inlet structure 150 to achieve the alteration of the pump.

To handle rope R, a set of rollers 152 is positioned in the pump inlet to pull the rope into the pump and provide a positive inlet pressure for filling the pump tooth cavities and also densifying the polymer, if it is in a foamed condition.

With particular reference to FIG. 6, each roller 152 includes a cylindrical roll portion 152a, a pair of helical end gears 152b which mesh with the herringbone gears of the associated gear 70 below each roller, and axially extending stub shafts 152c. Shafts 152c are rotatably mounted in inlet structure 150 by bearings 154. In this manner, each roller 152 is driven by its associated herringbone gear in the directions indicated in FIG. 5.

For foam materials of very low density it is preferable to drive rollers 150 independently of gears 70 to obtain desired feed rates to the pump. This may be accomplished by positioning the juxtaposed gear 152b on each roller such that they intermesh with each other but not with the herringbone gears 70, and providing an external drive to one of the stud shafts 152c.

As best illustrated in FIG. 5, inlet structure 150 defines an inlet 166 which is complementary to the cylindrical surface of roller 152a, and is provided with cutouts 167, FIG. 7, for receiving end gear 152b. The minimum width of the inlet (parallel to gear axis) is equal to the width of gears 70.

The bottom surface 151 of inlet structure 150 overhangs the gear chamber 58 at each side, FIG. 5, and a pair of wipers 168 having a generally wedge-shaped cross section abut against these overhanging portions and are secured within chamber 58 by bolts, not shown. Each wiper 168, includes a wiper surface 168a positioned at zero clearance with the surface of roller 152a. Wipers 168 thus prevent polymer from being recirculated about the periphery of the rollers as they rotate in the directions indicated.

In operation, rope R is fed between the nip of rollers 152 which press the polymer into a charging zone 170 to fill the tooth cavities of gears 70. The polymer is carried by the gears 70 into the gear chamber or free media space 58 and then through the seal zone 74 (shown enlarged for clarity) for positive displacement (pumping) into outlet 103, as the herringbone teeth of the gears mesh.

On-Line Direct Additive Injection

Both the gear pump 30, FIG. 2, and modified gear pump with rollers 130, FIG. 5, include provision for the direct injection of additives into the pump for mixture with the polymer. The additive in liquid form may be pumped through plural conduits 100 (only one of which is illustrated) in the inlet section of the pump either parallel to perpendicular to the gear axis, FIG. 5, or into contact with roller 152a FIG. 7, which doctors the additive into the charging zone for mixture with the polymer. Solid additives, which cannot be melted for introduction into the pump via conduits 100, may be fed into the pump through a screw extruder 102 FIG. 2, built into the gear housing and extending laterally outwardly from the pump.

Extruder 102 includes a screw 102a, which is driven by motor 102b and extends coaxially within a tubular housing 102c from an input hopper 102d at one end to the media free space adjacent the gears. Preliminary mixture of the additive and melt is achieved in the terminal end of the extrude, by means of a high pressure melt feedback conduit 104 which extends from the outlet of the gear pump to the output end of the extruder. In this manner the melt and additives are mixed in the last few flights of the extruder screw and introduced into the media free space for final mixing with the polymer in the gear pump. Conduit 104 may be either sized to provide proper feedback rate or may be equipped with an orifice plate or valve to provide variable feedback.

In addition to additive injection at the gear pump, additives may also be introduced through the top of vent stack 22. In the case of solid additives, they may be sprinkled over the surface of the polymer melt where the heat of the polymer melts the additives. The thus melted additives are mixed with the polymer as the material passes through the shear field in the gear pump.

The mixing of additives and polymer, whether introduced through vent stack or gear pump, is accomplished in the pump by the shear actions induced in the flow patterns within the pump, particularly as the material enters and is subsequently displaced from the gear tooth cavities.

For materials requiring a higher degree of mixing then performed by the gear pump, a static mixer, e.g. one of the type known commercially as a Kenics mixer, may be connected to the discharge of the gear pump to provide further mixing.

Compounding Systems

The gear pumps described above may also be utilized in compounding systems to increase the capacity and lower the operating costs. Compounding systems are similar to a recovery system in that more than one operation is performed by the compounding system. The material to be compounded is (1) fluxed, (2) mixed, and (3) pumped through the pelletor. By separating the pumping operation and relegating it to a gear pump of the present invention, significant improvements are obtained.

Compounding systems using extruders, whether single-screw or multiple-screw, are modified so that only the fluxing and mixing operations are performed by the extruder. The material is then fed to a gear pump for the pumping operation.

Figure 8A:
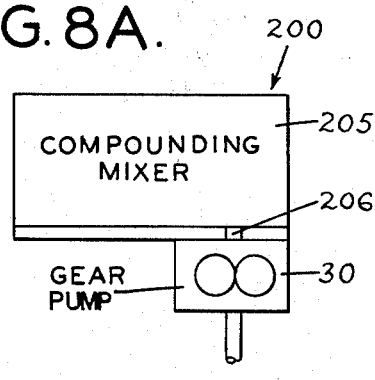
FIGS. 8A and 8B are schematic views illustrating compounding systems equipped with the pump of FIGS. 2 and 5, respectively.
Figure 8B:
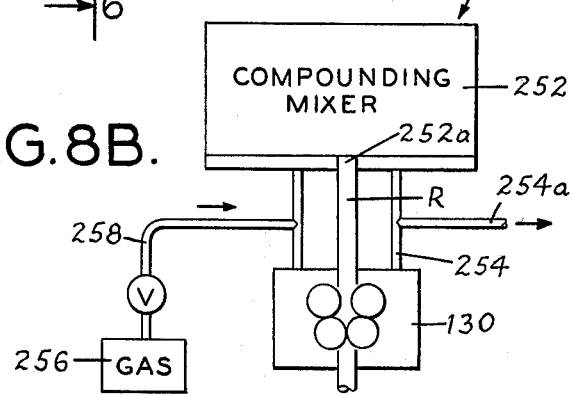

FIGS. 8a and 8b illustrate schematically two compounder-gear pump systems, 200 and 250, respectively. System 200 includes a compounding mixer 205 which may be of the batch or continuous discharge type. Compounder 205 discharges material through outlet 206 into a gear pump 30 of the type described above. By relegating the pumping operation to gear pump 30, which is insensitive to viscosity fluctuation, increased compounding capacity and production rate are achieved with a reduced product temperature rise. Final temperature reductions of up to 80° C may be achieved by the utilization of gear pump 30 for the pumping operation.

The system 250 includes a compounder 252 of either the batch or continuous process type which discharges the polymer in the form of rope R from outlet 252a. The polymer rope is enclosed within a conduit 254 which extends from outlet 252a to the inlet of a roller equipped gear pump 130, described above, for pumping. An inert atmosphere such a nitrogen gas is supplied to the interior of conduit 254 from source 256 through line 258. Any excess gas is withdrawn from conduit 254 through line 254a. It will be appreciated that the inert atmosphere prevents the precuring of the polymer as it passes from the compounder to the gear pump.

FABRICATING SYSTEMS

Figure 9:
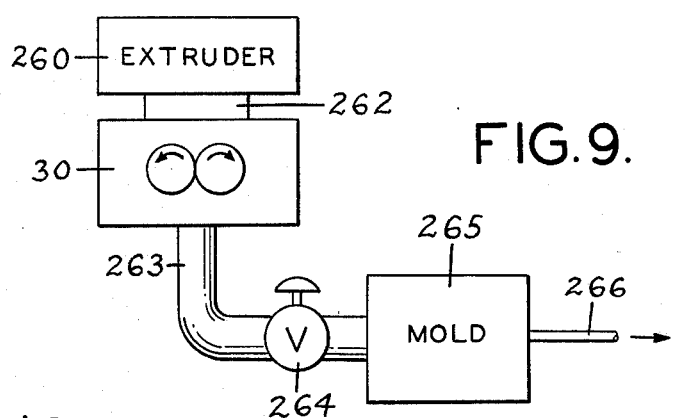
FIG. 9 is a schematic view illustrating the use of a gear pump of the present invention in combination with an extrusion die or mold in a fabrication process.

The gear pump of the present invention may also be used in the ultimate fabrication of material from polymers. FIG. 9 illustrates schematically a gear pump 30 closely coupled to a plasticating extruder 260 by conduit 262. Die 265 is used generically to cover both a restrictor for the fabrication of continuous products having a cross-section determined by the restrictor, e.g. film 266, pipes, structural beams, and a mold die for the fabrication of pressure molded articles. In the latter case, a control valve 264 is utilized in line 263 connecting pump 30 to die 265 to pulse polymer into the die mold 265.

The gear pump 30 is the final element for promoting polymer melt flow into the die 265. The use of the gear pump to provide either continuous pressurized polymer for continuous extrusion or discrete charges of pressurized polymer for molding articles provides lower energy consumption for the fabrication system than comparable screw extruder or pressure cylinder method, respectively.

ALTERNATIVE MODULAR EMBODIMENTS

The basic modular gear pumps 30 and 130, described above, may be further formed by modular components to increase the utility and flexibility. Various other modular configurations will now be described.

Modularity may be achieved in a number of ways including: (a) gear housing casting with modular gear insert, FIGS. 10 and 11; (b) gear housing casting which is split to increase the axial bore width with modular inserts, FIGS. 12 and 13; (c) pump body fabricated of independent modular sections, FIGS. 17 and 18; (d) and modular and roller configurations FIGS. 14–16a.

Figure 10:
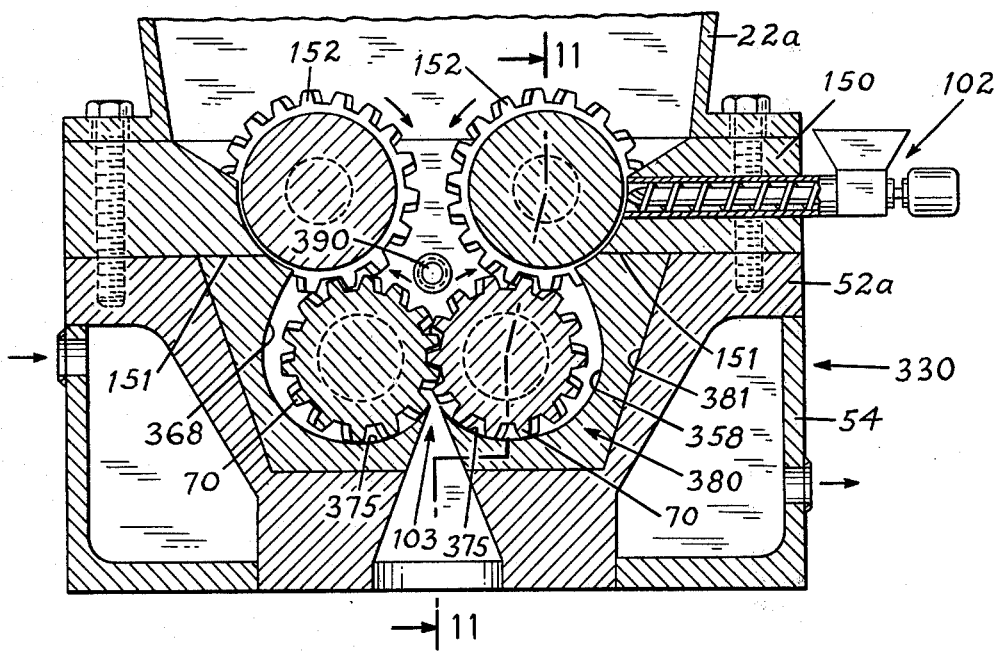
FIG. 10 is a cross-sectional view of a modular gear pump with feed rollers wherein the entire inlet/gear cylinder section is replaceable.
Figure 11:
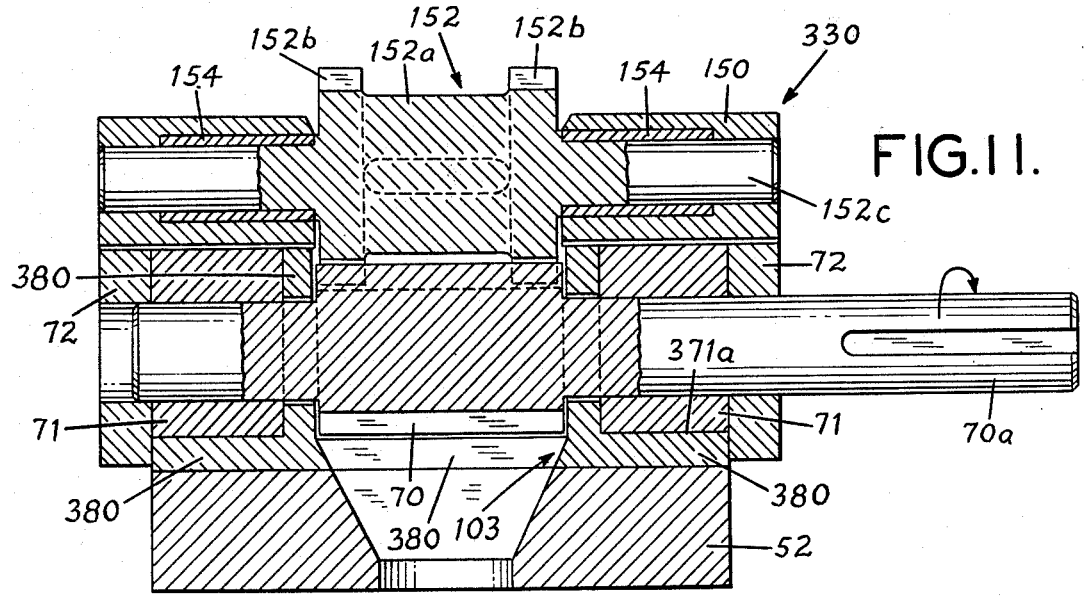
FIG. 11 is a sectional view taken along line 11—11 in FIG. 10.

FIGS. 10 and 11 illustrate a gear pump 30 similar to the pump 130, described above, which is equipped with feed rollers 152. Corresponding parts are designated by the same part designations described with pump 130.

As previously described, the contour of the media free space is a function of the viscosity of the particular polymer being pumped. It will therefore be appreciated that the ability to easily vary the media free space of a pump is highly desirable. Additionally, the ability to change the gear diameters (and thus the media free space expansion) is also desirable to accommodate the production rate of the reactor. To this end, pump 330 includes an inlet/cylinder insert 380 of generally trapezoidal shape which is nestably received in a complementary cutout 381 within gear housing 52 which extends through the entire housing. Insert 380 is retained within cutout 381 by the overhanging portion 151 of inlet structure 150 and defines the media free space chamber 358 at its inner surface.

Insert 380 also defines wiper portions 368 immediately adjacent each roller 152a and seal zones 375 adjacent the discharge outlet 103. Thus, the insert 380 serves the functions of several of the previously described structural elements. But, in addition, insert 380 also mounts the bearing 71 within cylindrical bores 371a and defines the discharge outlet 103.

Thus, the insert 380 together with herringbone gears 70, bearing 71 and end plates 72 form a removable package which can be custom designed for a particular polymer viscosity and production rate. Insert 380 may also be easily heat treated or plated for desired characteristic.

Pump 330 has certain other modifications over pump 130 including the deletion of feedback conduit 104 which, if desired, may be included. Additionally, additive extruder 102 has been relocated to the position of additive port 100 and an additive port 390, which may also include a screw extruder, has been located at the mixing zone parallel to the axis of gear rotation.

Figure 12:
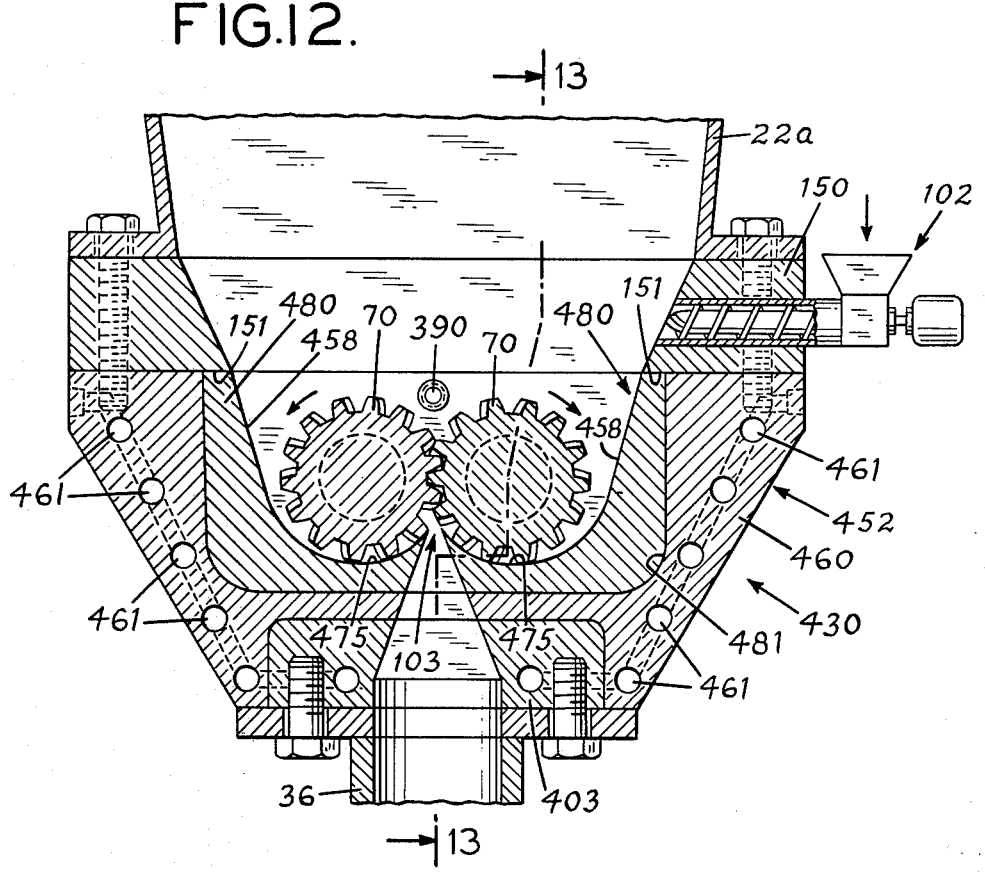
FIG. 12 is a cross-sectional view of a modular gear pump wherein the body is formed by two halves for increasing the gear width by modular additions.
Figure 13:
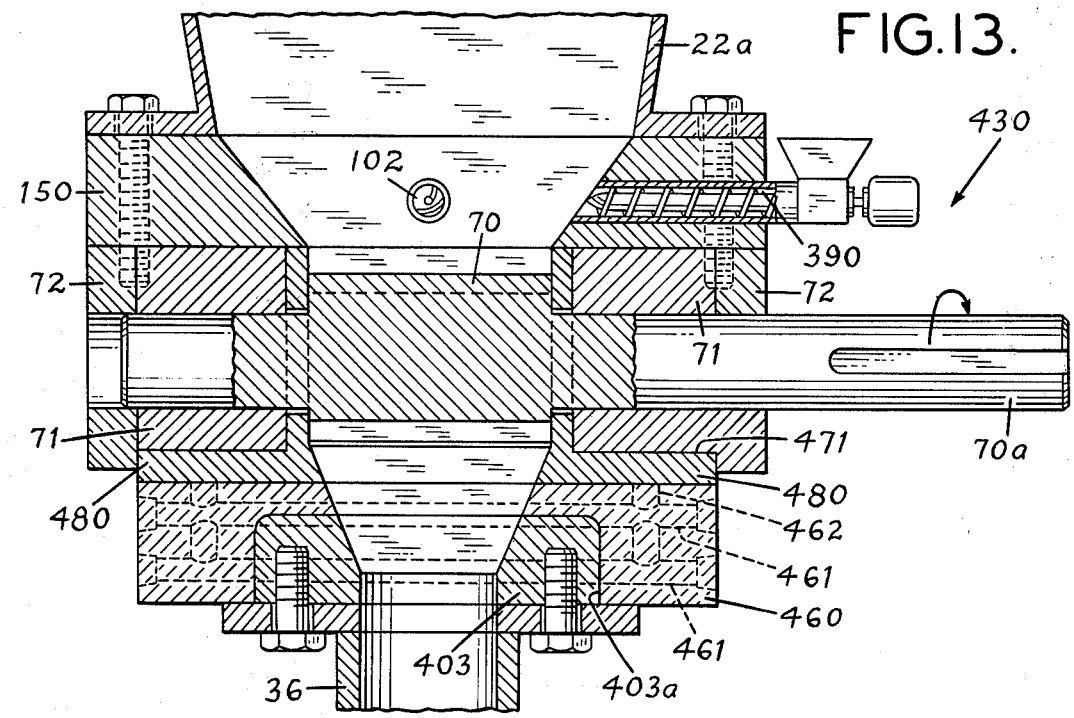
FIG. 13 is a sectional view taken along line 13—13 in FIG. 12.

FIGS. 12 and 13 illustrate a pump 430 in which the gear housing 452 is cast in two half sections which are symmetrical axially about a plane perpendicular to the gear axis to permit axial variation of gear width. The two halves are secured together by axially extending bolts or the like (not shown). Housing 452 includes a thickened side wall 460 to accommodate a plurality of heat transfer passages 461 which extend laterally therethrough and are interconnected by vertical passages 462, FIG. 13. Steam or other heat transfer (heating or cooling) is circulated through passages 461 and 462 to control the temperature of the pump.

Similar to pump 330, pump 430 includes an insert 480 which is retained in a complementary shaped cutout 481 within housing 452 by the overhanging portion 151 of inlet structure 150. Insert 480 defines the media free space chamber 458, seal zone 475 at its inner surface 458, and outlet 103. Additionally, insert 480 mounts the herringbone gear shafts and bearing 71 in bores 471 to provide a removable assembly. In the event that an axially larger assembly is to be inserted within housing cutout 481, the two halves of housing 452 are detached and a modular housing insert is positioned therebetween. These modular housing inserts are described below in connection with FIG. 14.

Since an axial enlargement of the housing 452 also enlarges the outlet 103, a modular outlet insert 403 may also be utilized. Insert 403 is retained in a rectangular cutout 403a at the base of housing 452 and held therein by fasteners (not shown). Insert 403 includes heat transfer conduits 461 and 462 which mate with those in housing 452. The use of the insert 403 provides a continuous mating surface for the flange connection of the outlet pipe 36 or other equipment to which the polymer is discharged.

The split housing 452 may also be formed to eliminate end plates 72. This is accomplished by machining bores 471 from the inside of insert 480 to provide a shoulder at the exterior end of the bore.

Figure 14:
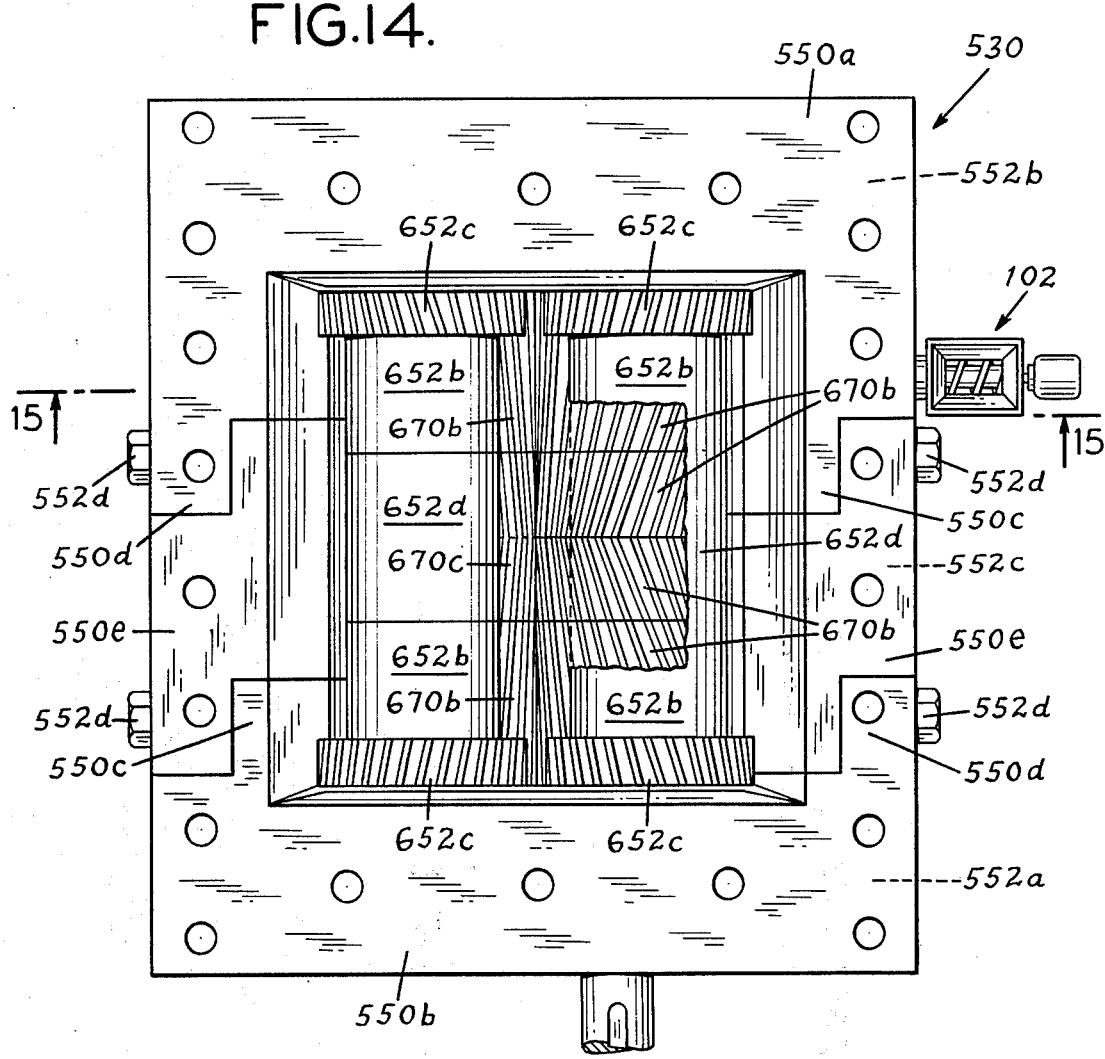
FIG. 14 is a top plane view of a modular gear pump with feed rollers wherein the gears and rollers are modular for increasing the capacity of the pump.
Figure 15:
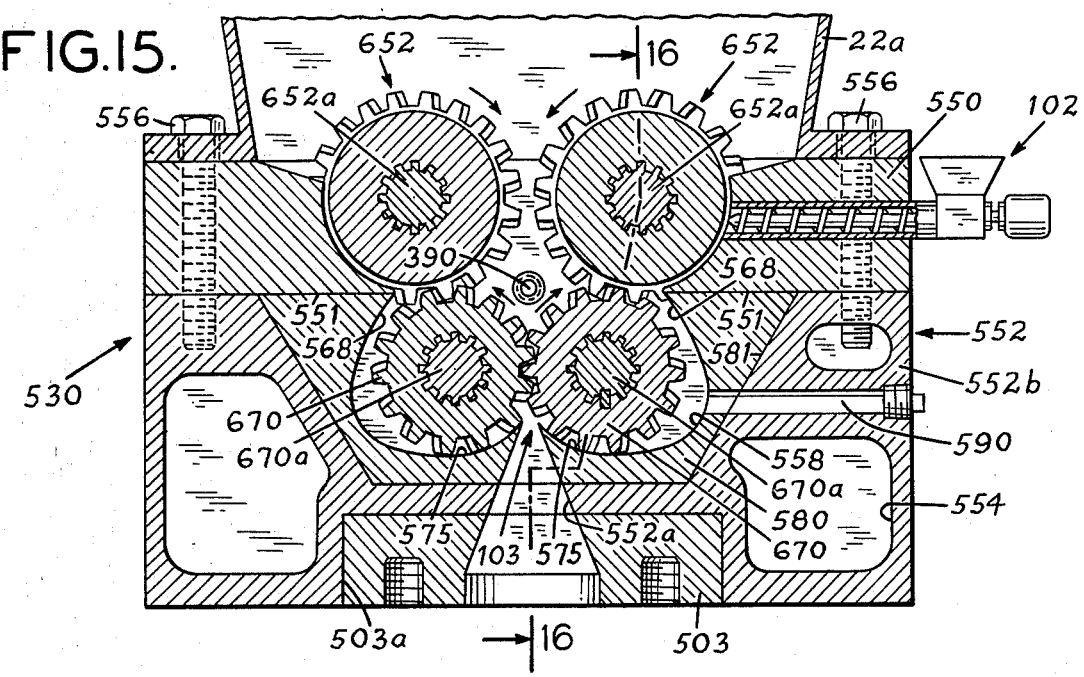
FIG. 15 is a cross-sectional view taken generally along line 15—15 in FIG. 14.
Figure 16:
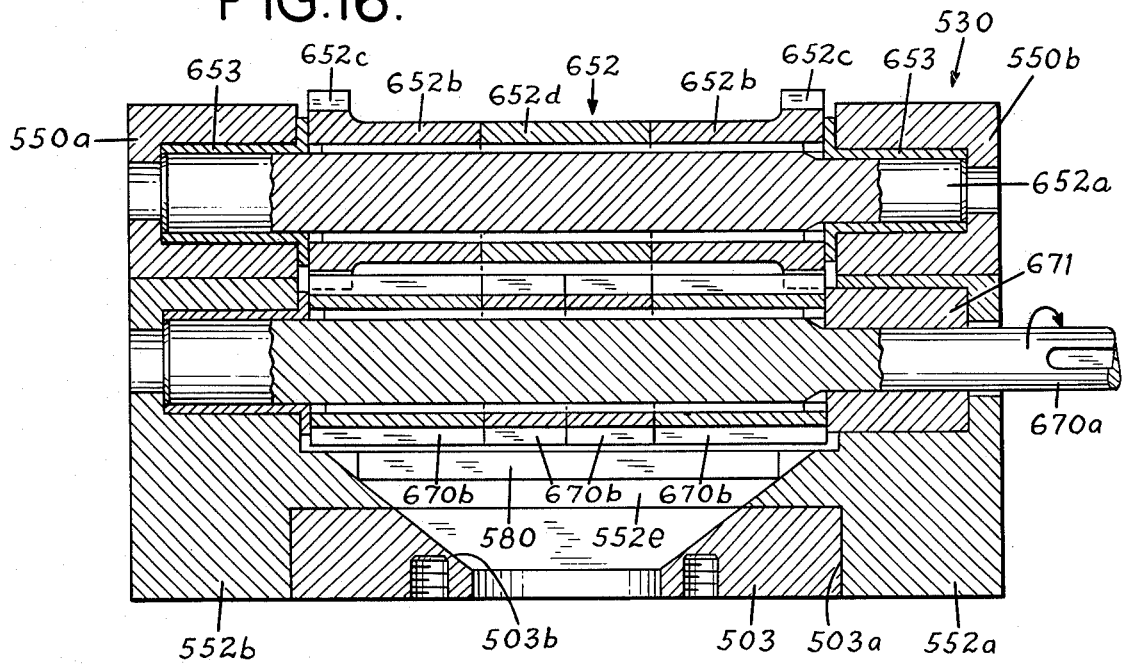
FIG. 16 is a cross-sectional view taken generally along line 16—16 in FIG. 15.

FIGS. 14-16 illustrate a further modular pump design in which not only the housing but also the gearing and feed rollers are modules. Pump 530 includes a split inlet structure 550, and split housing casing 552.

Inlet structure 550, FIG. 14, includes a pair of plate-like structures 550a and 550b having L-shaped interlock end portions 550c and 550d between which is located a pair of complementary shaped inserts 550e, which extend the axial dimension of the inlet structure. Plates 550b and inserts 550e are secured to the underlying gear housing 552 by fasteners 556.

Housing 552 is a modified version of housing 52 and includes an integral steam chest 554. Housing 552 is a pair of symmetrical "halves" 552a and 552b as described above in connection with FIG. 13 and an intermediate insert 552c. The housing "halves" and insert underlie the inlet structure and are interconnected by fasteners 552d.

The interior surface of housing 552 defines a trapezoidal receiver 581 in which an insert 580 is located. Insert 580 is retained in receiver 581 by the overlying end portions 551 of inlet structure 550. The interior surface of insert 580 defines wiper portion 568, media free space chamber 558 and seal zones 575, as previously described. Insert 580 extends between the end portions 552a and 552b, FIG. 16, across insert 552c. A modular outlet insert 503 is retained in cutout 503a in the gear housing portions by fasteners not shown. Insert 503 defines the outlet discharge 503b at its inner surface and abuts against a bottom flange portion 552e of the gear housing. Insert 580 in turn overlies the top surface of flange portion 552e.

With reference to FIG. 15, additive injection is provided by extruder 102 and conduit 390 at the inlet structure and may also be provided through conduit 590 (shown plugged).

The roller assemblies 652 and gear assemblies 670 are also modular in construction and are mounted on splined shafts 652a and 670a, respectively.

The modular arrangement of roller assemblies 652 and gear 670 enables the performance characteristics of the pump to be varied and also permits ready replacement of parts. More particularly, the use of helical gears to form the herringbone gear pattern has several advantages:

a. The choice of any helix angle can be accommodated due to the reduction of fabrication difficulties.

b. The expanded choice of helix angles permits optimization of the gears with respect to varying physical properties of the reactor product mix.

c. Gear segments can be varied to match reactor conversion rates.

d. In order to facilitate additive dispersion, a smaller circular pitch gear can be employed.

With particular reference to FIGS. 14 and 16, each roller assembly 652 is formed by a pair of end rollers 652b having integral helical end gears 652c and a central cylindrical roller 652d. To increase the axial length of roller assembly 652 additional rollers 652d or different length rollers 652d are added to the assembly. Shafts 652a include stub rotatably mounted in inlet structure 550 by bearing 653 having end thrust collars. As described above, gears 652d mesh with the underlying herringbone pattern gear to provide conjoint rotation therewith.

Gear assemblies 670 are also modular and may be formed completely by helical gears 670b as illustrated by the right side gear assembly (as viewed in FIG. 14.) In this case, a central pair of helical gears are positioned symmetrically about the center of shaft 670a to form a herringbone pattern and additional helical gears are stacked axial therefrom. Thus an even number of helical gears from the herringbone pattern.

Alternatively, a central herringbone gear 670c as illustrated on the left gear assembly in FIG. 14 may be used. In this case, helical gears 670b are positioned axially on both sides of the central herringbone gear 670c to form the herringbone pattern.

Thus, an unlimited variation of axial lengths for the roller and gear assemblies may be provided by the addition of roller and gear modules, respectively.

Gear shafts 670a are rotatably mounted in housing 552 by bearings which may be a collar bearing 653 or a journal bearing 671.

Figure 16A:
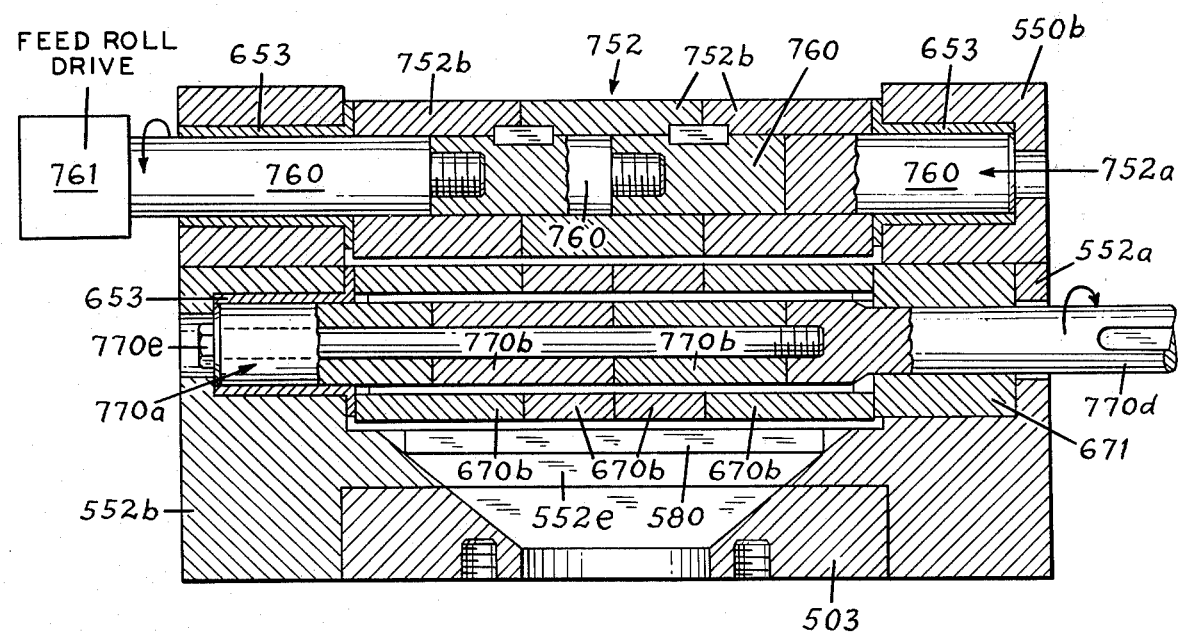
FIG. 16a is a cross-sectional view similar to FIG. 16, illustrating an external drive for the feed rollers.

FIG. 16a illustrates an alternative pump structure similar to FIG. 16. Roller assembly 752 includes a segment shaft 752a formed by a plurality of threadably connected or butted segments 760 to allow axial enlargement by the addition of segments thereto. Each roller shaft 752a is driven independently of the gears 770 by drive 761. The roller surface is provided by multiple cylinders 752b which are keyed to the shaft segments for rotation therewith.

Gear assembly 770 includes a segment shaft 770a having hollow shaft segments 770b interconnected to end shaft 770d by a longitudinally extending bolt 770e. The exterior surface of shaft 770a is splined to retain helical gears 670b therein.

Figure 17:
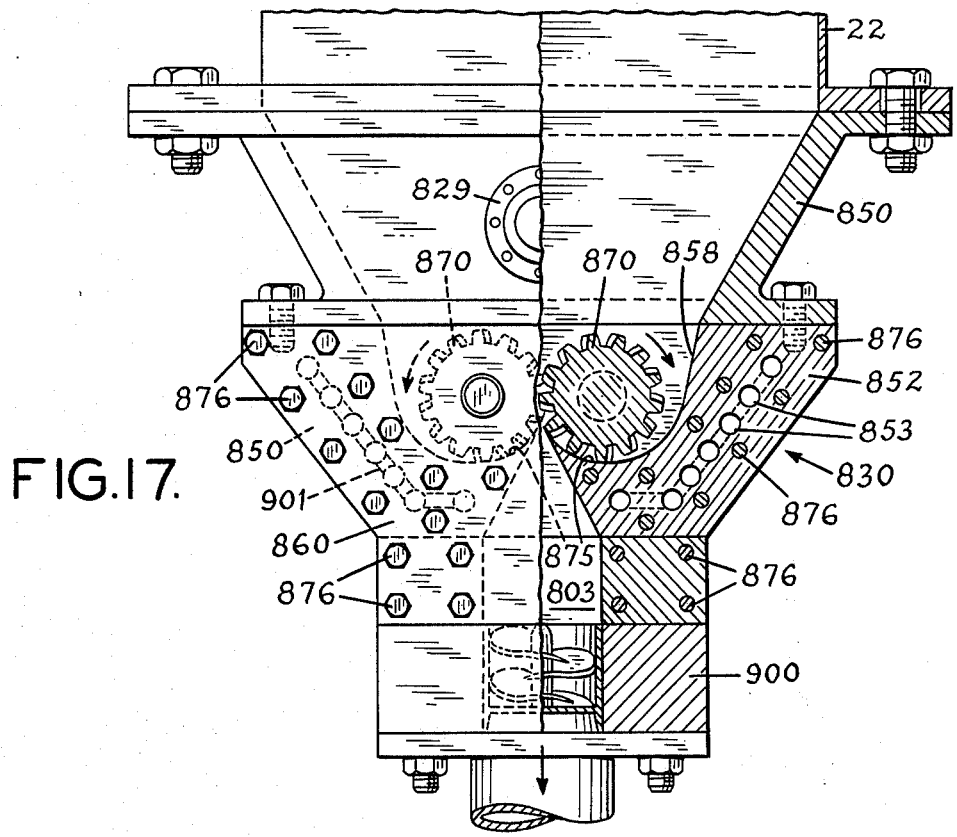
FIG. 17 is a side elevation view with certain portions broken away in cross-section illustrating a completely modular gear pump embodiment.
Figure 18:
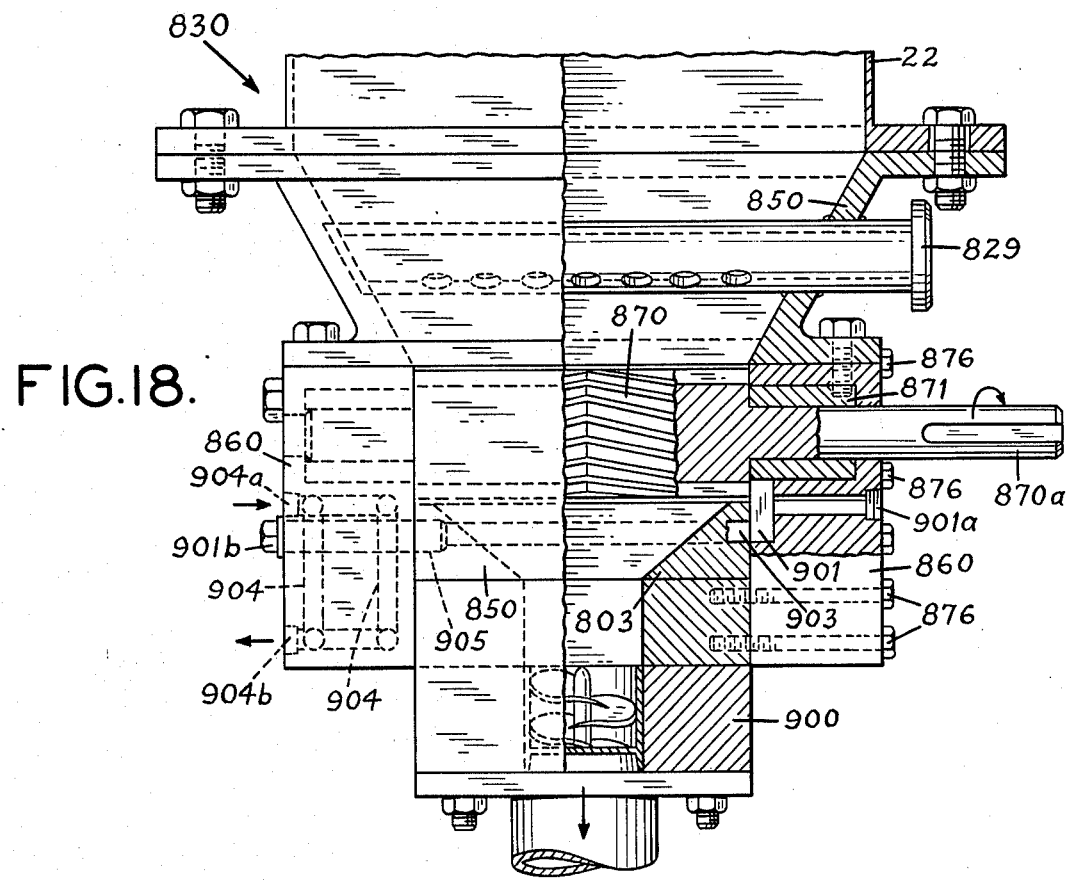
FIG. 18 is a front elevation view of the pump of FIG. 17 with certain portions broken away in cross-section.

FIGS. 17 and 18 illustrate a further modular pump 830 which is close coupled to vent stack 22 by means of the inlet structure 850, thereby eliminating the necessity for section 22a and the attendant pressure loss. Inlet structure 850 includes an additive injection tube 829 which extends across and above the mesh line of the gears 870.

The internal configuration of the gear assembly may be of any of the types previously described, i.e. one piece or modular. Therefore, a detailed description of the assembly will not be repeated.

The basic attribute of modular pump 830 is the provision of five basic modules, a pair of gear housings 852 which are symmetrical about the mesh line of gears 870; a pair of platelike end structures 860 which abut against each end of the housing 852 and extend downward thereform; and an outlet structure 803 which abuts against the bottom of the housing 852 and is positioned between the end structures 860.

With reference to FIG. 17, the pair of housings 852 have thickened side walls which include a plurality of axially extending heat transfer fluid passageways 853. The interior surface 858 of housing 850 defines the media free space chamber and seal zone 875, and outlet aperture, as previously described.

The end structures 860 carry the gear shafts 870a within bearings 871 and are fastened to the housings 850 and outlet structure 803 by longitudinally extending bolts 876. As illustrated, outlet structure 803 is close coupled to a mixer module 900, which is also fastened to end structures 860 by bolts 876.

In addition, end structures 860 include a manifold network 901 having an inlet 901a and outlet 901b for interconnnecting the passages 853 in housings 850 and supplying the heat transfer medium thereto and to passage 903 in outlet structure 803. The manifold 901 may be directly abutted against the passages, or a nipple coupling 905 may be provided. An additional heat transfer network 904, having an inlet 904a and outlet 904b is provided for the depending portions of the end structures.

Pump 830 provides several advantages including:

a. Interchangeable media free space configurations for particular product mixes.

b. The individual replacement of worn or corroded sections.

c. Facilitation of finishing and treatment of internal surfaces.

d. Provision of mixing/dispersion systems in the outlet module as required for additive applications.

These and other modifications may be made to the present invention by those skilled in the art without departing from the scope and spirit of the present invention as pointed out in the appended claims.

What is claimed is:

1. In a process for the production of polymer wherein a liquid polymer melt and entrained volatile monomer are delivered from a reactor to a product receiver for partial flashing of the volatile monomer the improvement comprising the steps of transferring the polymer from the bottom of said product receiver to the top of a vent stack; flashing the remaining volatile monomer from the melt in the vent stack; discharging said polymer melt from the bottom of the vent stack into the inlet of a gear pump having a pair of horizontal, intermeshing, rotating gears; directing the melt between said gears with the use of a pair of opposed cylindrical surfaces whose elements are parallel to the gear axes, said surfaces extending below the plane of the gear axes and each surface defining with its proximate gear axis a decreasing hydraulic radius toward the bottom pump discharge; discharging pressurized melt from the intermeshing gears through an outlet having a width corresponding to the gear width and a length corresponding to the tooth height of said gears, respectively, while providing a seal between each gear and the pump housing adjacent the outlet; sensing and maintaining the level of liquid in said stack to provide a pressure head above said gear pump.

2. The process of claim 1, further including sensing the torque and rotational speed operating parameters of said gear pump, feeding back the sensed parameters to control means to calculate the viscosity of the polymer melt according to the formula $\mu = K_1 N/T$, where $\mu$ is the viscosity, $K_1$ is a proportionality constant for the pump, and T,N are the torque and rotational speed parameters and generating a control signal from said calculated viscosity to provide closed-loop melt-index control of said reactor.

3. The process of claim 1, further including sensing the torque, rotational speed and pressure differential parameters of said gear pump, feeding the parameters to a control means to calculate the viscosity of the polymer melt according to the formula $$\mu = K_1 \frac{T}{N} - K_2 \frac{\Delta P}{N},$$

where $\mu$ is the viscosity, $K_1$ and $K_2$ are proportionality constants for the pump, and T, N are the torque and rotational speed parameters, and $\Delta P$ is pressure differential, and generating a control signal from said calculated viscosity to provide closed-loop melt-index control of said reactor.

4. The process of claim 1, further including the step of introducing an additive into said polymer at said gear pump, whereby said additive is mixed into said polymer during pumping action.

5. The process of claim 4, wherein said additive is introduced into the polymer melt adjacent said gears.

6. The process of claim 5, wherein said additive introduction is performed by conveying the additive in a screw extruder.

7. The process of claim 6, further including the step of feeding a portion of polymer from the discharge of said pump into said screw extruder, whereby a partial mixing of additive and polymer is performed prior to introduction of the additive into the pump.

* * * * *

UNITED STATES PATENT OFFICE

CERTIFICATE OF CORRECTION

Patent No. 4,032,391        Dated June 28, 1977

Inventor(s) I. Moked, et al.

It is certified that error appears in the above-identified patent and that said Letters Patent are hereby corrected as shown below:

Col. 1, line 7, "system" should read "systems".

Col. 4, line 49, "outler" should read "outlet".

Col. 6, line 60, "150,000/year" should read "$150,000/year".

Col. 8, line 33, "ratational" should read "rotational".

Col. 8, line 34, "$\gamma$" should read "$\dot{\gamma}$".

Col. 8, line 37, "$\dot{\gamma} = \pi TN \div C$" should read "$\dot{\gamma} = \pi DN \div C$"

Col. 9, line 11, "$\mu = k_1 (N/T)$" should read "$\mu = k_1 \frac{T}{N}$".

Col. 9, line 18, before "of the pump" insert "or outlet".

Col. 10, line 63, "parallel to perpendicular" should read "parallel or perpendicular".

UNITED STATES PATENT OFFICE
CERTIFICATE OF CORRECTION

Patent No. 4,032,391  Dated June 28, 1977

Inventor(s) I. Moked, et al.

It is certified that error appears in the above-identified patent and that said Letters Patent are hereby corrected as shown below:

Col. 11, line 8, "extrude" should read "extruder".

Col. 13, line 65, after "550a" insert "and 550b".

Col. 14, line 48, before "rotatably insert "shafts".

Col. 14, line 50, "652d" should read "652c".

Col. 14, line 60, "from" should read "form".

Col. 16, line 34, "$\frac{N}{T}$" should read "$\frac{T}{N}$".

Signed and Sealed this

Eleventh Day of October 1977

[SEAL]

Attest:

RUTH C. MASON
Attesting Officer

LUTRELLE F. PARKER
Acting Commissioner of Patents and Trademarks